US007356597B2

(12) United States Patent
Van Buuren et al.

(10) Patent No.: US 7,356,597 B2
(45) Date of Patent: Apr. 8, 2008

(54) METHOD AND SYSTEM FOR DISTRIBUTION AND BILLING OF PRODUCTS VIA A TRANSMISSION NETWORK

(75) Inventors: René Van Buuren, RW Enschede (NL); Geert Kleinhuis, TX Eernewoude (NL); Martin Streng, KS Hengelo (NL)

(73) Assignee: Koninklijke KPN N.V., The Hague (NL)

( * ) Notice: Subject to any disclaimer, the term of this patent is extended or adjusted under 35 U.S.C. 154(b) by 968 days.

(21) Appl. No.: 10/416,786

(22) PCT Filed: Nov. 29, 2001

(86) PCT No.: PCT/EP01/14192

§ 371 (c)(1),
(2), (4) Date: Aug. 28, 2003

(87) PCT Pub. No.: WO02/44960

PCT Pub. Date: Jun. 6, 2002

(65) Prior Publication Data

US 2004/0049431 A1    Mar. 11, 2004

(30) Foreign Application Priority Data

Nov. 29, 2000    (NL) .................................. 1016731

(51) Int. Cl.
*G06F 15/16* (2006.01)
(52) U.S. Cl. .................. 709/227; 709/217; 705/26
(58) Field of Classification Search ........... 709/200, 709/201, 227, 217; 705/1, 26, 39, 50

See application file for complete search history.

(56) References Cited

U.S. PATENT DOCUMENTS

| 6,701,303 | B1* | 3/2004 | Dunn et al. .................... 705/75 |
| 7,177,830 | B2* | 2/2007 | Shields et al. ................. 705/35 |
| 2006/0218651 | A1* | 9/2006 | Ginter et al. .................. 726/27 |

FOREIGN PATENT DOCUMENTS

| EP | 0 855 687 | 7/1998 |
| WO | WO 99/50771 | 10/1999 |

OTHER PUBLICATIONS

M. Connolly, "IBM's Electronic Commerce Solution: Commercepoint", IBM Systems Journal, vol. 36, No. 1, 1997, pp. 162 166.
D. Seachrist, "Hanging out an Internet shingle", Byte (International Edition), Apr. 1997, McGraw-Hill, vol. 22, No. 4, pp. 136 140.
T. Green, "Commerce servers labs test", Informationweek, Apr. 16-29, 1997, EMAP Computing & CMP Media inc., No. 3, pp. 78-82, 84-88, 92-96, 98 100 and 102-103.

* cited by examiner

*Primary Examiner*—Frantz B. Jean
(74) *Attorney, Agent, or Firm*—Michaelson & Associates; Peter L. Michaelson

(57) ABSTRACT

Method and system for distribution of products via a transmission network which connects a customer processor, one or more provision processors and a transaction processor. The customer selects, via his customer processor, a product at a provision processor or at the transaction processor which is provided with product information of all connected provision processors. The customer orders the selected product, after which the provision processor sends the selected product and the billing information to the transaction processor. The transaction processor subsequently establishes a connection with the customer processor and sends the product received from the provision processor to the customer processor. The billing information is sent to a collection address.

10 Claims, 2 Drawing Sheets

METHOD AND SYSTEM FOR DISTRIBUTION AND BILLING OF PRODUCTS VIA A TRANSMISSION NETWORK

BACKGROUND OR THE INVENTION

1. Field of the Invention

The invention relates to a method and system for the distribution of products via a transmission network.

2. Description of the Prior Art

Such methods and the systems required for the implementation thereof are generally known, in particular in the field of the Internet. Products are here and in the rest of this text understood to mean information, multimedia objects with, for example pictures and/or music, shareware and freeware programs, etc. All such products can be sent by a product provider to a customer via the transmission network. If such products are not free of charge, their delivery to the customer must be billed. To this end, a connection to a (banking) collection processor (or collection server) is generally made via the transmission network, and billing data relating to the product and the customer are exchanged via a secure connection. If the customer has an account with the collection processor, the billed amount can be debited directly. In other cases, the collection processor can, for example, send a bill by post to the customer, which must subsequently be paid by the customer.

It is clear that it is up to each product provider to find a solution for both the actual delivery of the products and for the billing and collection for delivered products. Moreover, customers also have to deal with different providers for the different products involving different procedures for financial settlement. This can all be a time-consuming business, particularly for international transactions.

SUMMARY OF THE INVENTION

It is an aim of the present invention to provide, both for product providers and for product customers, a more transparent, reliable and efficient medium for (international) transactions of products via the Internet or other transmission network. The invention accordingly provides—in brief—for the facilitation of both the actual distribution of products from different producers (product providers) to their customers, as well as of the further (financial) settlement thereof. The advantage for the providers is that they only have to deal with a single party, which takes care of the actual distribution, the security thereof—an important aspect for the delivery of electronic products via the Internet—and the billing. The invention thus comprises a method for the distribution of products via a transmission network, to which is connected a customer processor related to a customer, a provision processor related to a product provider and a transaction processor, which method is characterised by the following steps:

a. the customer selects a product via the customer processor and the transmission network;

b. the customer orders the selected product via the customer processor and the transmission network;

c. the provision processor and the transaction processor establish a secure (by means of encryption, certificates, etc.) connection with each other via the transmission network, and the provision processor sends the selected product and the transaction information to the transaction processor;

d. the transaction processor establishes a connection with the customer processor via the transmission network and sends the product received from the provision processor to the customer;

a. the transaction processor processes the transaction information and sends billing information (metering information) to a collection address, for example to the customer, to the customer's bank or to an organization with which the customer already has a (collection) relationship, for example, his/her power utility, telecom operator, etc.

The afore-mentioned steps must be preceded by something else; there are two possible options, namely—option I—the step:

a' the customer establishes a connection with the provision processor via the customer processor and the transmission network and exchanges information with the provision processor about the products provided from the provision processor;

and—option II—the following two steps:

a'1 the provision processor and the transaction processor establish a connection with each other and exchange information about the products provided from the provision processor;

a'2 the customer establishes a connection with the transaction processor via the customer processor and the transmission network and exchanges information with the transaction processor about the products provided from the provision processor.

With option I, the processor (terminal) of the customer makes contact with the processor of the product provider and there selects—in an iterative process—the desired product. The delivery then takes place from the transaction processor, which also handles the billing, etc. With this option, therefore, the customer processor first establishes a connection with the provision processor, which connection is then re-routed—after selection and ordering by the provision processor—to the transaction processor, which takes care of further settlement (delivery and billing)

With option II, the customer processor does not make contact with the provision processor, but with the transaction processor and there selects the desired product in a database which has previously (step a'1) been filled by the provision processor with information about the products that the provider has in its delivery programme. Step a'1 is (only) performed as often as necessary to keep the database of the transaction processor up to date. After the desired product has been selected (at the transaction processor), the transaction processor requests the selected product from the provision processor, after which the transaction processor sends the product via the transmission network to the customer (the customer processor). With this last option, therefore, the customer processor establishes a connection only with the transaction processor, which facilitates both the selection and the further settlement and will usually be preferred to option I.

The invention also comprises a system and transaction processor for the facilitation of the above-described method, which will now be described.

DETAILED DESCRIPTION

Figure 1:
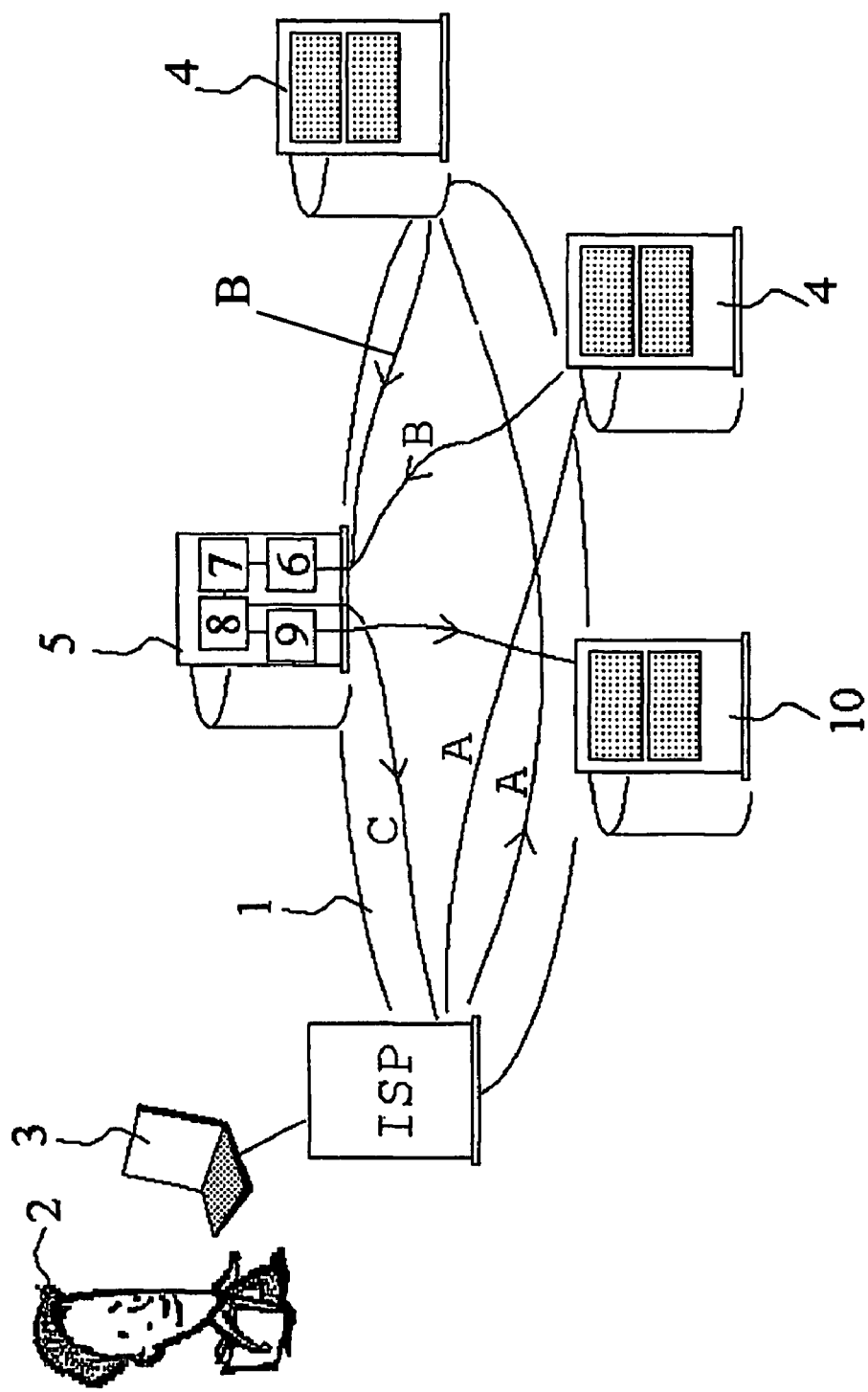
FIG. 1 depicts a first embodiment of the inventive system, including a transmission network, for distributing products.
Figure 2:
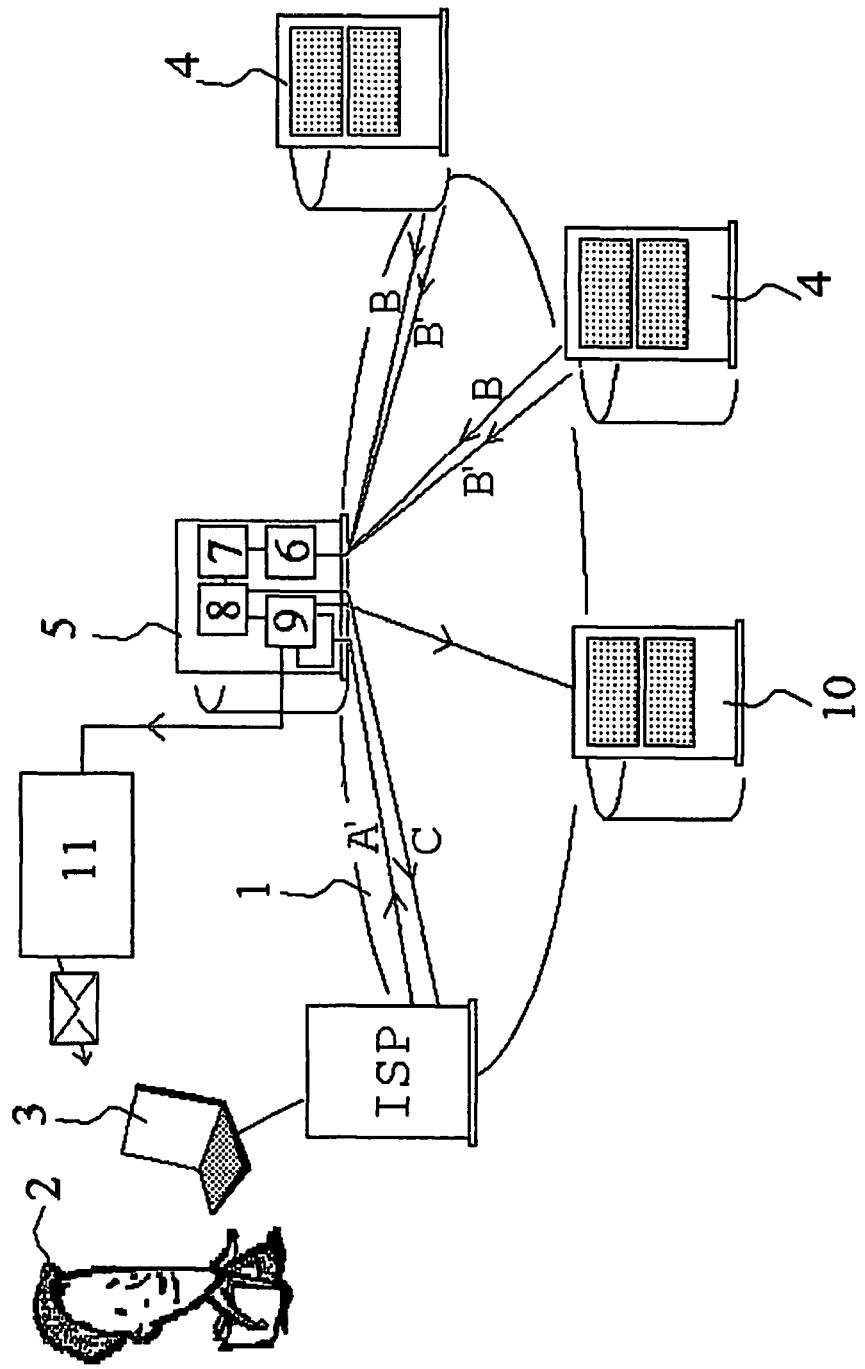
FIG. 2 depicts a second embodiment of the inventive system, including a transmission network, for distributing products. For ease of reference, the same reference numerals are used to designate highly similar, if not identical, elements common to both figures.

FIG. 1 and FIG. 2 each show a system for the distribution of products via a transmission network 1, to which is connected—via an Internet Service Provider (ISP)—a customer processor 3 related to a customer 2 and a provision processor 4. This provision processor 4 comprises means for offering and delivering products via the transmission network. The distribution system further comprises a transaction processor 5 for delivering and completing orders.

After—in FIG. 1—the provision processor 4 has received from the customer processor 3 via a connection A a selection code relating to a product selected by the customer at the provision processor, the provision processor establishes a connection B with the transaction processor 5 and sends the selected product and the transaction information relating to the product and to the customer 2 to the transaction processor 5. Subsequently, the transaction processor 5 sends the product via a connection C to the customer processor 2. The transaction processor 5 offers the billing information to the customer 2, either likewise via the transmission network 1, for example by e-mail, or via an alternative route, for example by non-electronic mail ("snail mail").

The transaction processor 5 in FIG. 1 comprises means 6 for the receipt of the product selected by the customer from the provision processor 4 via the transmission network 1 and also the transaction information relating to that product and/or the customer 2, including billing information relating to that customer, in particular the price of the product. The price can be expressed as the total price for the product, for example 50 USD for downloading an item of registered software, or as a unit price, for example 1.20 USD per transmitted megabyte of video material. In the latter case, either the provision processor 4 or the transaction processor 5 can meter the number of Mbytes delivered to the customer processor 3. Preferably, this metering is performed by the transaction processor 5 in a metering device 7. In such a case, the provision processor 4 must furnish the transaction processor 5 with the relevant tariff as billing information, in this case 1.20 USD/MB.

The transaction processor 5 furthermore comprises means 8 for the sending on via the transmission network 1 of the product received from the provision processor 4 to the customer processor 3 and means 9 for the processing and sending of billing information that forms a basis for the ultimate collection of the owed amount. This billing information is offered to the customer 2 for collection, either via the transmission network 1 or via an alternative route. Another possibility is—as shown in FIG. 1—for the billing information (including an authentication by the customer) to be sent to a banking processor 10 that debits the price of the delivered product from the account of the customer 2.

In figure 2, the provision processor 4 and the transaction processor 5—in accordance with option II—establish a connection with each other and exchange information about the products provided from the provision processor. This is an update process that can take place periodically or—initiated by the provision processor 4—whenever a new product release is issued. It is sufficient to send.merely that information to the transaction processor 5 that is needed to enable (potential) customers 2 to make a choice when selecting a product. At this stage, the actual products are not transferred to the transaction processor, since this would require a very large storage capacity in the transaction processor 5—all the more so because the transaction processor 5 can operate for many other provision processors 4. Only relevant product information about products that can be obtained via the transaction processor 5—from different provision processors 4—is stored in the transaction processor 5. The transaction processor 5 functions in option II as (collective) electronic catalogue with facilities for ordering and paying; the provision processor(s) 4 function as warehouse.

It is pointed out that the "catalogue" of each product supplier 4 (provision processor) can in fact be stored in the transaction processor 5—in which case regular updates will be needed from the suppliers 4—or will have the form of (Internet) links that refer to—and on "clicking" establish a connection with—the "directory" of the relevant processor 4. Updating is then no longer required, although it is possible that "linking" will be somewhat slower. If a "linked" catalogue is used, the user performs searches in the various suppliers catalogues ("directories") via the (search engine or portal of) transaction processor 5.

In order to select and order a product, the customer 2 establishes a connection with the transaction processor 5, over which information is exchanged about the products available from the provision processor(s) 4. The customer then selects and orders the desired product. The transaction processor establishes, via the transmission network, a connection with the provision processor, that then sends the selected product to the transaction processor. The transaction processor establishes, via the transmission network, a connection with the customer processor and then sends the product received from the provision processor to the customer processor, after which the transaction processor—via the transmission network or an alternative route—sends billing information to the customer or a banking processor 2. In figure 2, the billing information is sent from the device 1 to a collection processor 11—for example the (existing) "billing street" of a telecom operator or power utility—and then sent by traditional post to the customer 2. In this way, the product is paid for via the bill of the telecom operator or power utility. Incidentally, such organizations (telecom operator or power utility) can also perfectly well manage the transaction processor 5, and the (reliable) delivery of products from the product processors 4 fits in well with the services offered by such organizations.

Finally, the following should be noted:

For both the connection between the transaction processor 5 and the provision processor 4, as well as for the connection between the transaction processor 5 and the customer processor 3, use is preferably made of authentication and verification by means of electronic certificates that guarantee the reliable exchange of the products and customer information (in particular billing information) Furthermore, for the exchange of information between the customer processor, the provision processor and the transaction processor respectively, use is made of encryption of the exchanged information, as well as of "Non-Repudiation" processing (transmission/reception guarantee) of the exchanged information (for this latter, see among other sources http://marco.uminho.pt/CCG/papers/ digital-time-stamping-supp-non-repud. html.

The invention claimed is:

1. A method for distributing products via a transmission network, the network connecting a customer processor related to a customer, to a plurality of provision processors related to product providers, and to a transaction processor for distributing and billing said products, the method comprising the steps of:

the customer selecting, via the customer processor and through the transmission network, one of the provision processors so as to define a selected provision processor, and ordering a specific product through the selected provision processor;

the selected provision processor and the transaction processor, establishing a first connection with each other and via the transmission network, and the provision processor sending information regarding the specific product and also transaction information over the first connection to the transaction processor;

the transaction processor establishing a second connection with the customer processor, via the transmission network, and sending, via the second connection, the product information received from the provision processor to the customer processor; and the transaction processor processing the transaction information and sending billing information to a collection address.

2. The method recited in claim 1 wherein the selecting and ordering step comprises the steps of:

establishing a third connection, via the customer processor and the transmission network, between the one provision processor and the customer; and exchanging, via said third connection, information about those ones of the products then capable of being ordered through the one provision processor.

3. The method recited in claim 2 wherein the information exchanging step comprises the step of using electronic certificates whenever the information is exchanged between the customer processor and the one provision processor.

4. The method recited in claim 2 wherein the information exchanging step comprises the step of encrypting the information exchanged between the customer processor and the one provision processor.

5. The method recited in claim 2 wherein the information exchanging step comprises the step of processing the exchanged information on a "non-repudiation" basis.

6. The method recited in claim 1 wherein the selecting and ordering step comprises the steps of:

establishing a third connection, via the customer processor and the transmission network, between the customer and the transaction processor; and exchanging, via said third connection, information about those ones of the products then capable of being ordered through the one provision processor.

7. The method recited in claim 6 wherein the information exchanging step comprises the step of using electronic certificates whenever the information is exchanged between the customer processor and the transaction processor.

8. The method recited in claim 6 wherein the information exchanging step comprises the step of encrypting the information exchanged between the customer processor and the transaction processor.

9. The method recited in claim 6 wherein the information exchanging step comprises the step of processing the exchanged information on a "non-repudiation" basis.

10. A system for distributing products, comprising:

a customer processor related to a customer;

a provision processor for providing and delivering products via a transmission network;

a transaction processor; and the transmission network connecting the customer processor, the provision processor and the transaction processor; and wherein the following operations occur:

the provision processor receives a selection code related to one of the products then stored in the provision processor; and in response to the selection code: the provision processor and the transaction processor establish a connection with each other, the provision processor then sends, via the connection, the product corresponding to the selection code to the transaction processor, and the transaction processor sends the product, via the transmission network, to the customer processor and provides billing information to a collection address.

* * * * *